Sept. 6, 1927.  
H. L. BRADLEY  
VARIABLE CONDENSER  
Filed Oct. 17, 1924  
1,641,314  
2 Sheets-Sheet 2
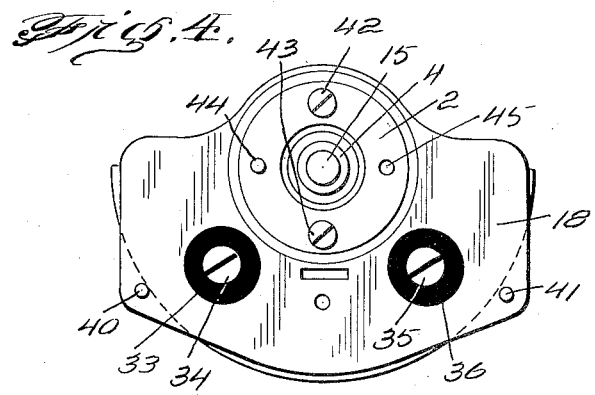
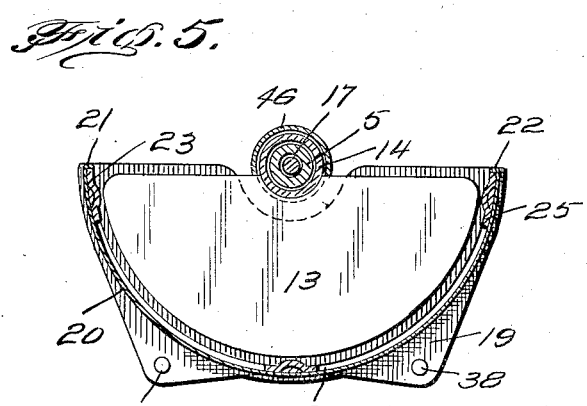
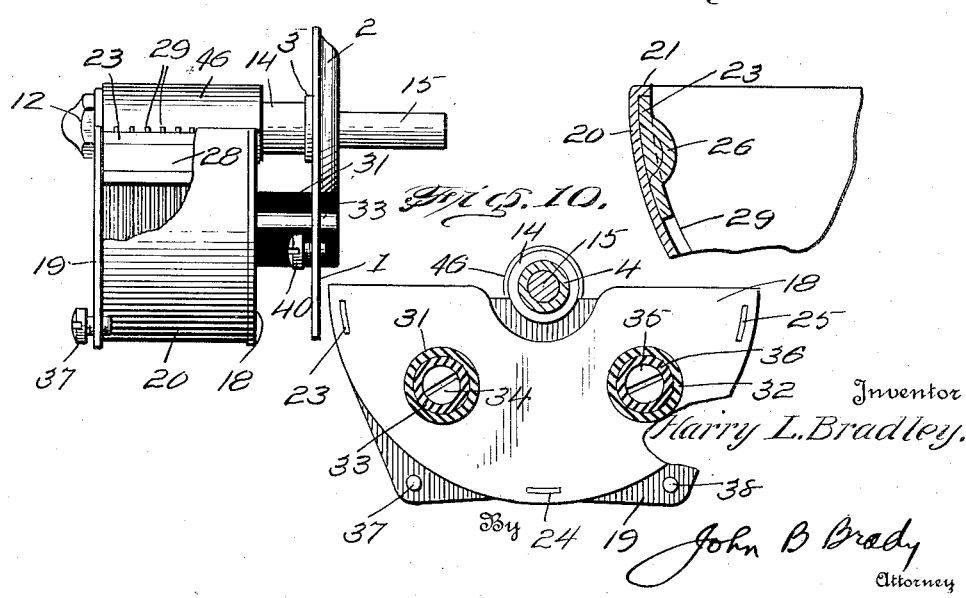
Inventor  
Harry L. Bradley.  
By John B Brady  
Attorney Patented Sept. 6, 1927.

1,641,314

UNITED STATES PATENT OFFICE.

HARRY L. BRADLEY, OF MILWAUKEE, WISCONSIN.

VARIABLE CONDENSER.

Application filed October 17, 1924. Serial No. 744,250.

My invention relates broadly to electrical apparatus, and more particularly to a construction of variable electrical condensers.

One of the objects of my invention is to provide a variable condenser construction of high electrical efficiency having mechanical features facilitating quantity production of the condenser.

Another object of the invention is to provide a single bearing for the rotor of a variable condenser with the bearings so arranged as to provide a rigid support at all times for the rotor plates in any selected position in which the plates may be moved with reference to the stator plates.

Still another object of the invention is to provide a rotor construction for a variable condenser wherein the several plates are supported in grooves disposed at intervals in a sleeve member concentric with the rotatable shaft, thereby forming a rigid support for the rotor plates without requiring spacer washers as heretofore used in variable condenser construction.

A still further object of my invention resides in the mounting of the stator plates without the employment of apertures, indentures, or extensions on the stationary plates by positively spacing the plates by means of projections formed in substantially flat side members at spaced intervals about the periphery of the stator plates.

Still another object of my invention is to provide a method of securing the assembled stator with relation to the rotor with minimum dielectric separating one set of plates from the other set of plates.

A still further object of the invention resides in the increase of electrical capacity of the condenser by the provision of a metallic casing disposed adjacent the peripheries of the stator plates and serving also as a mechanical protective member for the mechanism of the condenser.

My invention also resides in the mechanical construction of the rotor parts and terminals for the stator and rotor plates and arrangement of the condenser parts to enable the apparatus to be readily mounted with relation to other apparatus employed in electrical connection and associated with the apparatus of my invention, as will more fully appear in the specification hereinafter following by reference to the accompanying drawings wherein:

Figure 1 is a side elevation of the condenser partially in cross-section showing the arrangement of parts therein; Fig. 2 is a plan view of the lower portion of the condenser; Fig. 3 is a detailed cross-sectional view illustrating the dielectric material disposed between the rotor and stator; Fig. 4 is a top plan view of the variable condenser showing the provisions made for mounting the condenser with relation to a panel and in association with electrical apparatus employed in circuit therewith; Fig. 5 is a cross-sectional view through the condenser taken on line 5—5 of Fig. 1; Fig. 6 is an end view partially broken away to show the interior arrangement of the stator and rotor plates in the condenser; Fig. 7 is a fragmentary view showing the mounting which I provide for the stator plates; Fig. 8 is a plan view of the striplike side members which are spaced at intervals about the periphery of the stator plates and formed with projections serving to space the stator plates one from another; Fig. 9 is a detailed view of the rotor member showing the grooves which I provide for the support of the rotor plates; and Fig. 10 is a view taken through the condenser on line 10—10 of Fig. 1.

Heretofore in the art in the construction of electrical condensers it has been necessary to employ a relatively complicated die for stamping the stator and rotor plates of a condenser with apertures, indentures, or extensions adjacent the peripheries of the plates to enable the plates to be mounted. By the condenser construction of my invention I avoid complications in the construction of dies for the stamping of the condenser plates in that the plates are not provided with means for mounting the plates. In lieu of this I arrange a condenser frame with striplike members spaced at intervals about the periphery of the stationary plates, which striplike members are each provided with spaced extrusions along the lengths thereof between which the stator plates are located. The condenser is constructed of metallic plates with the entire frame thereof formed of metal. The rotor does not require the assembly of spaced washers upon a shaft as heretofore employed in the art. A single substantial bearing is provided for the rotor simplifying the condenser construction and facilitating the mounting of the condenser with relation to associated apparatus. A minimum amount of dielectric material is necessary in my condenser cona rotatable shaft disposed within said sleeve bearing, a cylindrical member journaled on said sleeve bearing and connected with said shaft, said cylindrical member having a plurality of grooves spaced one from another along the length thereof, a plurality of rotor plates secured in said grooves, a plurality of stator plates into which said rotor plates are adapted to be moved, and insulated means depending from said end plate member and arranged to support said stator plates with relation to said rotor plates.

2. A variable condenser construction, comprising in combination an end plate member, a sleeve bearing projecting from said end plate member, a rotatable shaft carried within said bearing, a cylindrical member journaled on said sleeve bearing and arranged to rotate with respect to said sleeve bearing, means for adjusting the tension between said rotatable shaft and said cylindrical member, and a plurality of rotor plates carried by said cylindrical member and adapted to be revolved upon rotation of said shaft.

3. A variable condenser construction, comprising in combination an end plate member, a sleeve bearing projecting from said end plate member, a rotatable shaft carried within said bearing, a cylindrical member journaled on said sleeve bearing and arranged to rotate with respect to said sleeve bearing, means for adjusting the tension between said rotatable shaft and said cylindrical member, a plurality of peripheral grooves in said cylindrical member spaced one from the other along the length of said member, and a plurality of rotor plates secured in said grooves and adapted to be revolved upon rotation of said shaft.

4. A variable condenser comprising in combination a set of stator plates, a set of rotor plates adapted to be moved in varying positions between said stator plates, a plurality of flat striplike members arranged to support said stator plates in spaced relationship and a casing member adapted to engage a pair of said striplike members and substantially enclose the peripheral edges of said stator plates, said casing members being arranged to present a capacity area with respect to said rotor plates.

HARRY L. BRADLEY.

Sept. 6, 1927. 1,641,343
J. W. MAYNARD
TEMPERATURE INDICATOR AND TIME INDICATING ATTACHMENT THEREFOR
Filed Jan. 9, 1926
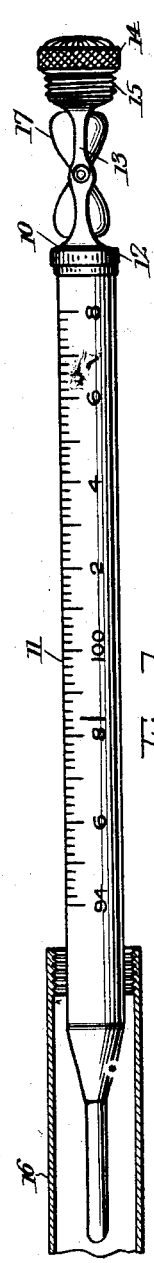
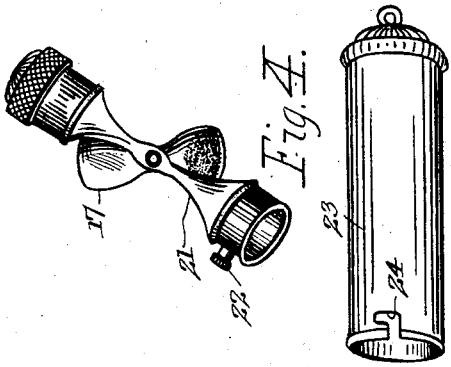
James W. Maynard
Inventor
By Emery, Booth, Janney & Varney
his Attorneys